(12) United States Patent
Iwanaga et al.

(10) Patent No.: US 6,444,376 B1
(45) Date of Patent: Sep. 3, 2002

(54) COLORING MATERIAL, COLORING MATERIAL FOR COLOR FILTER, DISPLAY DEVICE AND LIQUID CRYSTAL DISPLAY DEVICE

(75) Inventors: Hiroki Iwanaga, Yokohama; Katsuyuki Naito, Tokyo, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/534,314

(22) Filed: Mar. 24, 2000

(30) Foreign Application Priority Data

Apr. 1, 1999 (JP) .......................................... 11-094792

(51) Int. Cl.$^7$ .......................... G02B 5/20; G02F 1/1335; C07C 50/18
(52) U.S. Cl. ........................... 430/7; 552/209; 552/219; 349/106
(58) Field of Search ................................. 552/219, 209; 430/7; 349/106

(56) References Cited

FOREIGN PATENT DOCUMENTS

| DE | 1 186 967 | * | 2/1965 |
| DE | 1 194 082 | * | 6/1965 |
| JP | 5-331378 | | 12/1993 |

\* cited by examiner

Primary Examiner—John A. McPherson
(74) Attorney, Agent, or Firm—Oblon, Spivak, McClelland, Maier & Neustadt, P.C.

(57) ABSTRACT

Disclosed is a coloring material, comprising a plurality of organic basic skeletons each performing an acceptor function, and a donor substituent serving to connect two organic basic skeletons, wherein color is developed by the intramolecular electron migration between the substituent and the basic skeleton.

15 Claims, 3 Drawing Sheets

COLORING MATERIAL, COLORING MATERIAL FOR COLOR FILTER, DISPLAY DEVICE AND LIQUID CRYSTAL DISPLAY DEVICE

CROSS-REFERENCE TO RELATED APPLICATIONS

This application is based upon and claims the benefit of priority from the prior Japanese Patent Application No. 11-094792, filed Apr. 1, 1999, the entire contents of which are incorporated herein by reference.

BACKGROUND OF THE INVENTION

The present invention relates to a coloring material, a coloring material for a color filter, a display device and a liquid crystal display device.

In the conventional liquid crystal display device, a color filter is arranged in general on the outside of a glass substrate of the liquid crystal cell or on the inside of a counter electrode of the array substrate. Such a construction requires many manufacturing steps, making it difficult to lower the manufacturing cost.

On the other hand, attentions are paid to a CF on-array in which a color filter (hereinafter referred to as "CF") is arranged on the inside of the array substrate. The CF on-array permits diminishing the manufacturing steps, making it possible to manufacture a liquid crystal display device with a low manufacturing cost. However, since the color filter is in direct contact with the liquid crystal layer, a serious problem is generated as follows.

Specifically, TFT (thin film transistor) is used mainly for driving a liquid crystal display device. It should be noted that, in order to achieve such a TFT driving, it is necessary for the liquid crystal layer to have a large electrical resistance and, thus, a fluorine-based liquid crystal material meeting the particular requirement is mainly used. However, even if in the case of using such a fluorine-based liquid crystal material, the ionic impurities that lower the resistance value are migrated from the CF into the liquid crystal layer. Where the CF is arranged inside the liquid crystal cell, i.e., where the CF is arranged in direct contact with the liquid crystal layer, the impurities of the pigment, the impurities generated by deterioration of the pigment, etc. are dissolved in the liquid crystal layer so as to cause the resistance value of the liquid crystal layer to be lowered.

Particularly, in the CF on-array system in which the CF is arranged on the side of the array substrate, the CF is in direct contact with the liquid crystal layer because the transparent electrode on the CF is patterned, leading to a more serious situation.

In order to overcome the particular problem, it is proposed to form a protective layer consisting of a polymer on the CF positioned on the array substrate. However, additional process steps for forming the protective film are required, leading to an increase in the manufacturing cost.

It is naturally desirable to prevent the impurities that lower the resistance value from being dissolved in the liquid crystal layer without relying on a protective film. For achieving the particular system, it is very important to develop a pigment that is not decomposed by heat, light, etc. and that does not generate such impurities as to lower the resistance value even if decomposed. However, the conventional pigment fails to meet these requirements and, thus, a CF on-array has not yet been realized.

The conventional pigment includes, for example, phthalocyanine green (CI:G7) used in a green layer of the CF. G7, which has a high durability, has been widely used as a pigment for CF. However, where G7 is used in the CF on-array system, various defects, which are considered to be derived from reduction in the resistance value, are generated in the display device.

These defects are caused by the impurity generation. Although only traces of impurities are generated, the reduction in the resistance value of the liquid crystal layer is markedly affected by these impurities.

In order to achieve a CF on-array system by overcoming the above-noted problem, it is necessary to develop a pigment for CF having the characteristics given below:

1) The pigment should be stable against alkaline conditions, heat and light and should be excellent in durability;
2) Even if decomposed, the decomposed substances of the pigment do not form ionic impurities that cause the resistance value of the liquid crystal material to be lowered; and
3) The pigment should have a spectrum suitable for use in a CF so as to be capable of achieving a clear color display.

BRIEF SUMMARY OF THE INVENTION

An object of the present invention is to provide a coloring material exhibiting an excellent durability and capable of a satisfactory color display.

Another object is to provide a coloring material for a color filter exhibiting an excellent durability, capable of a satisfactory color display, and capable of preventing the decomposed substances thereof from lowering the resistance value of the liquid crystal material.

Another object of the present invention is to provide a display device capable of a satisfactory color display.

Still another object of the present invention is to provide a liquid crystal display device that does not bring about a marked reduction in the resistance value of the liquid crystal material and capable of achieving a satisfactory color display.

According to a first aspect of the present invention, there is provided a coloring material comprising a plurality of organic basic skeletons each performing an acceptor function and a donor substituent serving to connect two organic basic skeletons, wherein color is developed by the intramolecular electron migration between the substituent and the basic skeleton.

According to a second aspect of the present invention, there is provided a coloring material for a color filter, comprising a plurality of organic basic skeletons each performing an acceptor function and a donor substituent serving to connect two organic basic skeletons.

According to a third aspect of the present invention, there is provided a display element comprising the coloring material described above.

Further, according to a fourth aspect of the present invention, there is provided a liquid crystal display device provided with a color filter containing the coloring material for the color filter.

It is desirable for the basic skeleton to be an anthraquinone-based structure.

It is desirable for the coloring material for the color filter to have a chemical structure represented by any of general formulas (1) and (9):

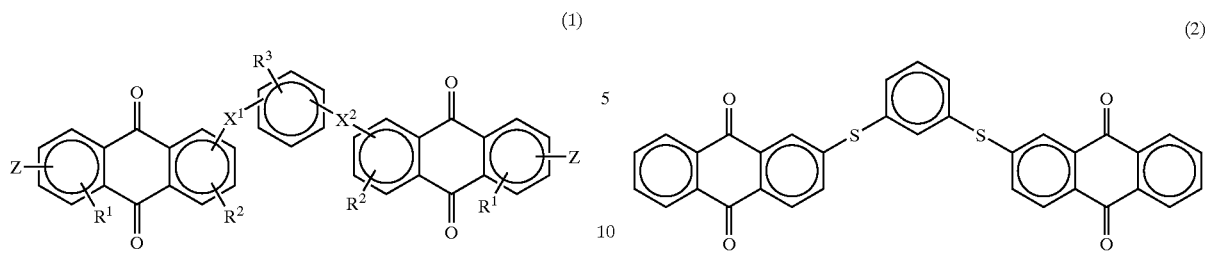

(1)

where each of R1, R2 and R3, which may be the same or different, is at least one of hydrogen and an alkyl group, each of X1 and X2, which may be the same or different, is selected from the group consisting of S, O, NH and Se, and Z is at least one of hydrogen and an alkyl group;

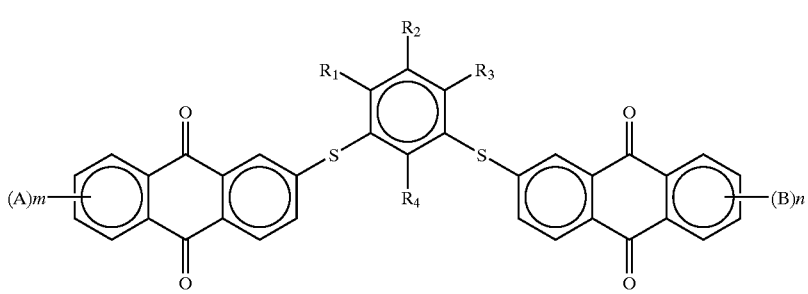

(9)

where R1, R2, R3, R4, A and B is selected from the group consisting of hydrogen atom, an alkyl group, a halogen atom, a nitro group, an amino group, a monoalkyl group, a dialkyl amino group, an alkoxy group, and a thioalkoxy group, and each of m and n is an integer of 1 to 4, wherein R1, R2, R3, R4 may be the same or different, and A and B may be the same or different.

When X1 and X2 of the formula (1) is S, the compound represented by the formula (1) is a di-sulfide.

It is desirable for the coloring material for a color filter to have a repeating unit represented by general formula (3) given below:

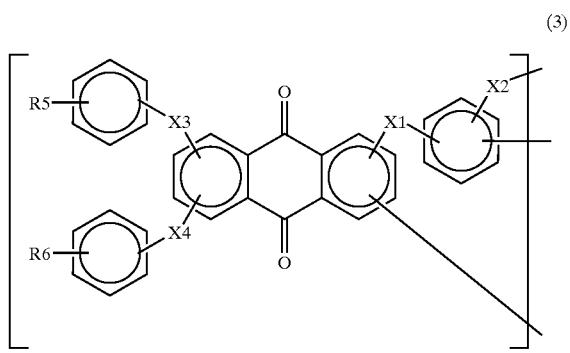

(3)

where each of R5 and R6, which may be the same or different, is one of hydrogen atom and an alkyl group, and each of X1, X2, X3 and X4, which may be the same or different, is selected from the group consisting of S, O, NH and Se.

To be more specific, it is desirable for the coloring material for a color filter to have a chemical structure represented by general formula (2) given below:

(2)

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
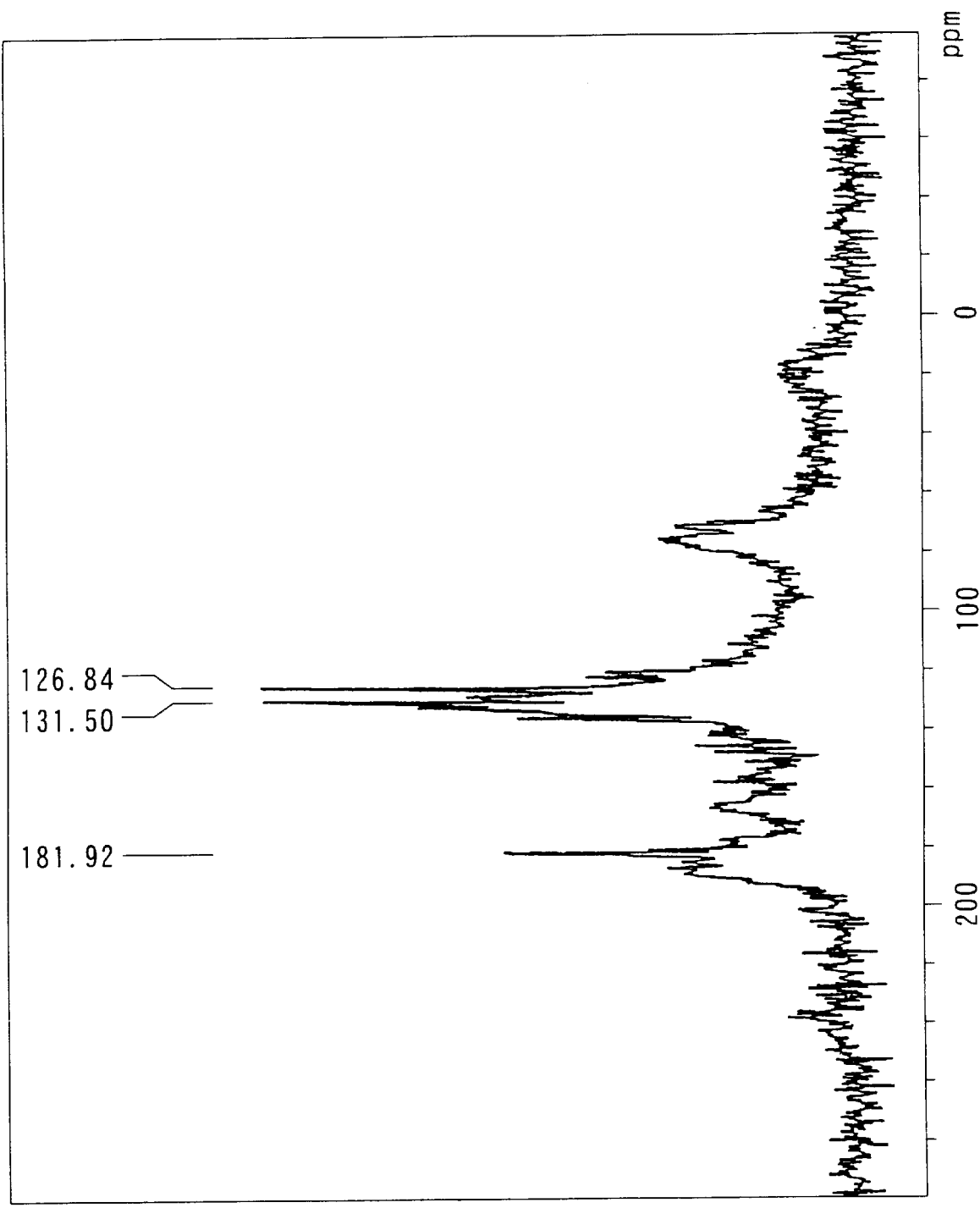
FIG. 1 shows a solid state NMR spectrum of a yellow pigment obtained in Example 1 of the present invention.

The present invention will now be described in detail.

As a result of an extensive research, the present inventors have found new materials in which a plurality of organic basic skeletons each performing an acceptor function are coupled with each other with a donor substituent interposed therebetween and a color is developed by the intramolecular electron migration between the substituent and the basic skeleton. It has also been found that the particular materials are suitable for use as a coloring material for a color filter (CF) or as a dichroic coloring matter mixed with a liquid crystal material, arriving at the present invention. The particular materials exhibit an excellent durability against heat, light, etc. In addition, the color development is performed by the intramolecular electron migration between the donor substituent and the basic skeleton performing an acceptor function. As a result, a satisfactory color display can be achieved in the case where the particular materials are used as the pigment for a display device, particularly, as a pigment for CF of a liquid crystal display device. For achieving the color development, it is necessary for multiple bonds to be conjugated between the basic skeleton and the substituent group. The intensity of the color development is determined by the intensity of the donor function of the substituent group. Where the coloring matter of the present invention is used as a coloring material for a color filter (CF), the resistance value of the liquid crystal material is not lowered by the substances formed by the decomposition of the coloring matter.

Incidentally, the acceptor performance and the donor performance is defined by the positiveness and negativity of the substituent constant with a hydrogen atom used as a reference.

Specific examples of the organic basic skeleton performing an acceptor function include, for example, anthraquinone, coumarin, perylene and derivatives thereof. In the present invention, these organic basic skeletons are collectively called anthraquinone type, coumarin type and perylene type basic skeletons including the derivatives thereof. All the three isomers are included in the case of the anthraquinone type basic skeletons.

Anthraquinone, coumarin and perylene are excellent in durability against alkali. Anthraquinone and perylene are particularly excellent in durability.

Specific examples of the raw materials of the substituent performing a donor function include, for example, thiophenol and derivatives thereof. Thiophenol and derivatives part thereof are excellent in durability against alkali.

In the case of using the basic skeleton and the substituent described above, the color development is performed mainly in the basic skeleton forming the backbone chain and, thus, it is unnecessary to use a chromophoric group that causes deterioration of the material. Even where a chromophoric group is required, it suffices to use a chromophoric group in a very small amount, with the result that the material is unlikely to be deteriorated.

If a plurality of basic skeletons each performing an acceptor function are coupled with each other with a substituent group performing a donor function interposed therebetween, formed is an intramolecular charge transfer complex in which an intramolecular electron migration is carried out, thereby to perform the color development. It has been clarified by the researches conducted by the present inventors that the color development has an absorption spectrum that makes the coloring matter of the present invention suitable for use as a coloring material for a color filter of a liquid crystal display device. It should be noted that, in the case of using the coloring material of the present invention for a color filter, ionic impurities are scarcely generated.

Specific construction of the present invention will now be described.

Compounds having a molecular structure denoted by formula (1) given previously are suitable for use as the coloring material of the present invention used in a color filter. The compound of formula (1) has 9,10-anthraquinone as the organic basic skeleton. R1, R2 and R3 in formula (1) include, for example, hydrogen atom and alkyl groups such as methyl, ethyl, normal propyl, isopropyl, normal butyl, and t-butyl. Z in formula (1) includes, for example, hydrogen atom and alkyl groups such as methyl, ethyl, normal propyl, isopropyl, normal butyl, and t-butyl. It is desirable for the compound having a chemical structure denoted by formula (1) to have a molecular weight of about 300 to 10000. Specific compounds of formula (1) in which Z is a hydrogen atom include the compounds denoted by chemical formulas (9) and (2). In these compounds, two 9,10-anthraquinone skeletons are coupled with each other with a thiophenol-based substituent interposed therebetween.

The compounds represented by chemical structures (9) and (2) develop a yellow color and have an absorption spectrum suitable for a satisfactory color display. To be more specific, the compounds having these chemical structures have a maximum absorption wavelength shorter than that of the conventional organic pigment and have a small width of the absorption spectrum, compared with the conventional organic pigment. The maximum absorption wavelength of the conventional yellow organic pigment is longer than 450 nm and the pigment develops a color close to orange rather than yellow. A pure yellow color was developed by only a pigment of a complex molecular structure having a halogen element such as chlorine. However, since the molecular structure is complex, the manufacturing of the pigment was high. In addition, the pigment was low in durability. In addition, if the element comprising the pigment containing a chlorine atom is burned, a chemical compounds harmful to the human body tends to be generated, which is undesirable in view of the environmental problem. Inorganic compounds such as zinc sulfide, which are also known as a pigment developing a pure yellow color, are also harmful. On the other hand, the coloring material having any of chemical structures (9) and (2), which do not have a halogen atom, is capable of achieving a clear yellow display. In addition, since the chemical structure is simple, the compound can be synthesized by a single synthesizing process, making it possible to synthesize the compound easily.

Also, as already described, the coloring material of the present invention is excellent in durability against heat, light, etc. and, even if decomposed, ionic impurities are not formed.

Compounds having a repeating unit shown in formula (3) given previously can be used as the coloring material of the present invention that is used for forming a color filter. The repeating unit shown in formula (3) has 9,10-anthraquinone as an organic basic skeleton. R5 and R6 included in formula (3) include, for example, hydrogen atom and alkyl groups such as methyl, ethyl, normal propyl, isopropyl, normal butyl, and t-butyl. The repeating unit of formula (3) forms compounds represented by formula (4) or (5) so as to develop magenta or cyan color, whose absorption spectra are suitable for performing a satisfactory color display. Also, these compounds are excellent in durability against heat, light, etc. and, even if these compounds are decomposed, ionic impurities are not formed, as already described.

Specific compounds having a repeating unit represented by formula (3) include compounds having chemical structures denoted by formulas (4) and (5) given below:

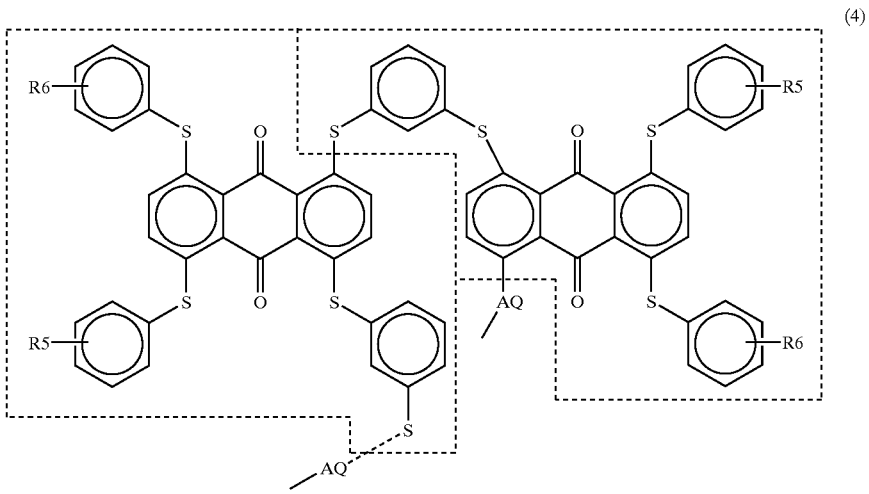

(4)

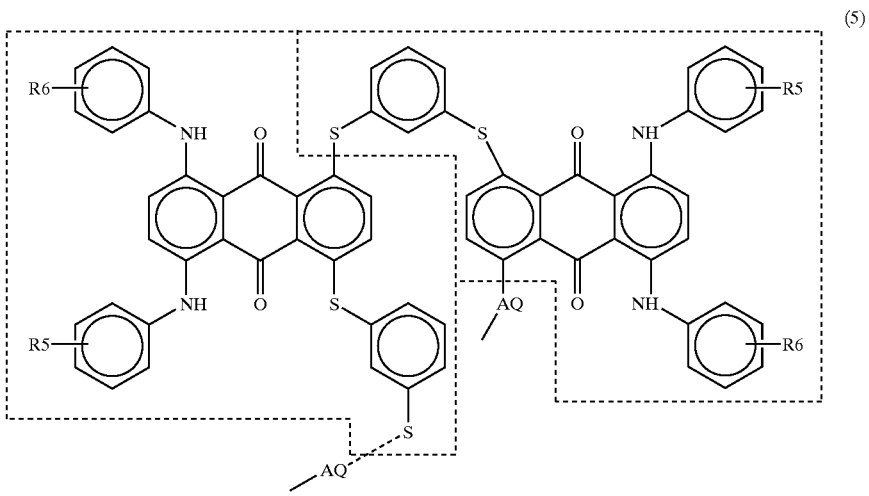

(5)

The regions surrounded by dotted lines in each of formulas (4) and (5) represent the repeating unit denoted by formula (3), and AQ represents the repeating unit thereof. The compound represented by formula (4) develops a magenta color. On the other hand, each of X3 and X4 in the repeating unit of formula (5) represents NH that performs a strong donor function in the compound represented by formula (5), with the result that the absorption spectrum of the compound represented by formula (5) is shifted toward the longer wavelength so as to allow the compound of formula (5) to develop a cyan color.

By mixing the coloring matters represented by formulas (3), (4), (5) and (9), it is possible to obtain RGB in the color filter of a liquid crystal display device. To be more specific, red can be obtained by mixing yellow and magenta. Green can be obtained by mixing cyan and magenta. Further, blue can be obtained by mixing magenta and cyan.

In formulas (3), (4), (5) and (9), anthraquinone is used as the organic basic skeleton. However, it is also possible to allow, for example, anthraquinone and perylene to be coupled with other with a substituent performing a donor function.

The coloring material of the present invention can be used as a pigment. Further, where the compound has a relatively small molecular weight and has a high solubility, some of the coloring materials of the present invention exhibits properties of a dye. The compound exhibiting properties of a dye has in general a long molecular structure and, thus, can be used, when dissolved in a liquid crystal material, as a dichroic coloring matter having a high dichroic ratio. The dichroic coloring matter can be obtained, for example, by introducing a substituent other than a substituting group performing a donor function into anthraquinone.

The coloring material of the present invention can be suitably used for coloring a color filter of a liquid crystal display device. In addition, the coloring material can also be used in, for example, a color display portion of a display device in which the location of the color film is controlled by an electrostatic force (Actuated Film Display).

The present invention is not limited to the embodiments described above and can be modified in various fashions.

Some examples of the present invention will now be described.

EXAMPLE 1

1,3-dithiol was added to 1 g of 2-chloro anthraquinone in a molar ratio of 1:1 so as to carry out reaction between the two within DMF under a nitrogen gas stream and in the presence of sodium carbonate. The reaction was carried out at 80° C. for 5 hours. After the reaction mixture was left to stand for 24 hours, followed by filtering the reaction mixture to obtain crystals and subsequently washing the filtrate with DMF, hexane and water in the order mentioned. Finally, the reaction product was dried under vacuum while heating the reaction product at 60° C. so as to obtain a yellow pigment of the molecular structure denoted by formula (2) at a yield of 90%.

Figure 2:
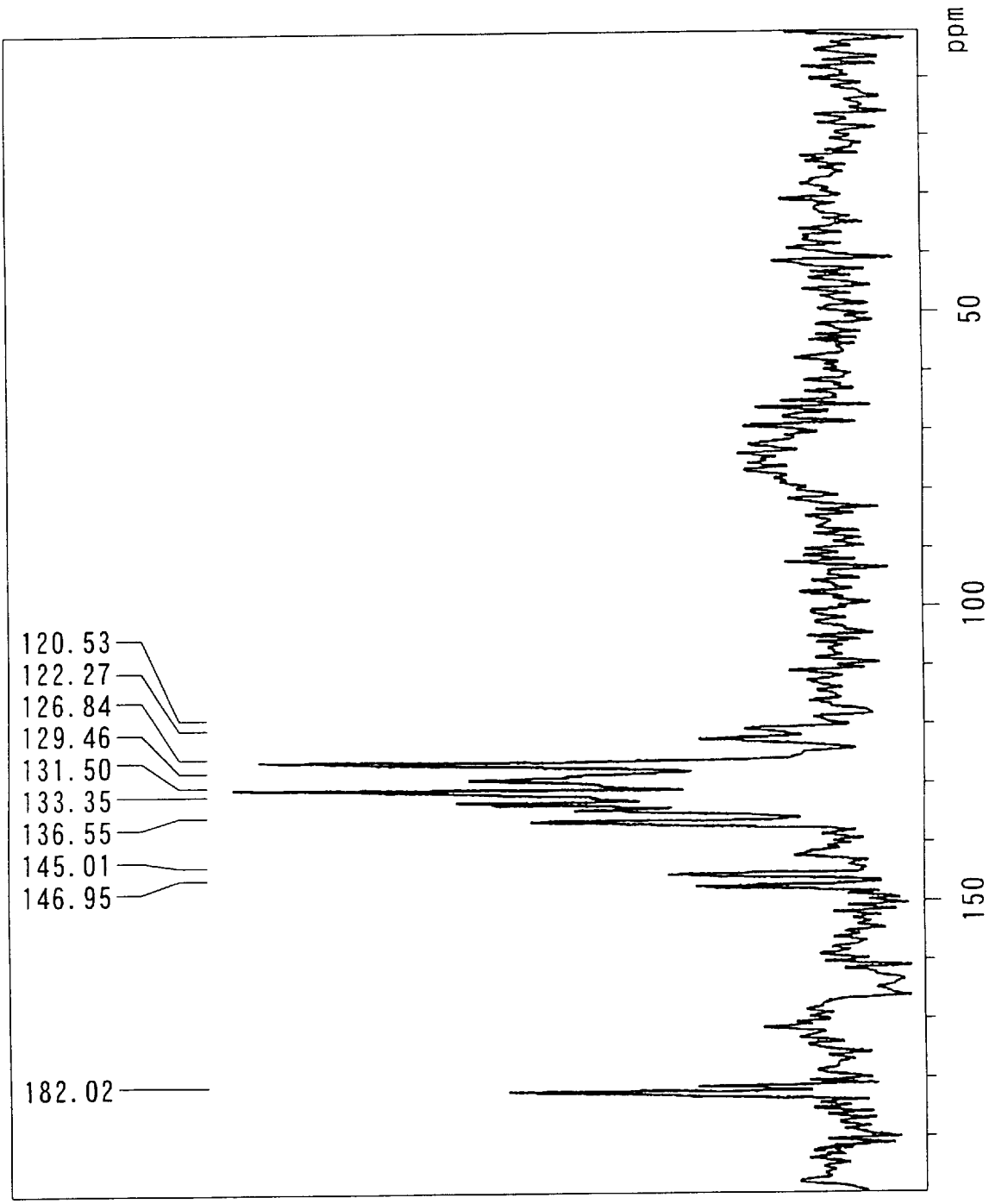
FIG. 2 shows a solid state NMR spectrum of a yellow pigment obtained in Example 1 of the present invention.

Each of FIGS. 1 and 2 shows the solid state NMR spectrum of the molecular structure represented by formula (2).

The pigment thus obtained was dispersed in an acrylic negative resist, followed by coating an array substrate with the resist and subsequently exposing the coating to light to form a pattern. As a result, a pseudo color filter of yellow alone was formed on the side of the array substrate. It has been visually confirmed that the pseudo color filter was capable of a good color display. Also, when observed 1000 hours later, defect in, for example, burning out was not recognized at all. The LCD was located on the condition of 70° C., 80% of moisture exposed to xenon lump (320 W/m$^2$). This implies that the resistance value of the liquid crystal layer was scarcely lowered and also implies that the yellow pigment thus prepared of the present invention exhibits an excellent durability against heat, light, alkali, etc.

Further, the yellow pigment (having an average particle diameter of 0.1 μm) prepared in this Example was dispersed in a resist so as to measure the spectrum and, thus, to obtain a half value width. The spectrum half value width denotes the wavelength region of the spectrum having an absorbance that is at least half the absorbance in the maximum absorption wavelength (having the longest wavelength). The degree of clearness in the color display can be increased with decrease in the half value width of the spectrum.

In the case of the yellow pigment obtained in this Example (having an average particle diameter of 0.1 μm), the half value width, which depends on the kind of the resist and the width of the particle diameter distribution of the pigment, was found to fall within a range of between 60 and 105 nm. It has also been found that the half value width was not larger than 90 nm under almost all the conditions.

The conventional yellow pigment has a spectrum half value width exceeding 100 nm and has a maximal absorption wavelength of 450 nm. Therefore, it is difficult to achieve a clear color display by using the conventional yellow pigment. In addition, the color phase of the conventional yellow pigment is close to orange. If a halogen element such as chlorine is introduced in an attempt to overcome these inconveniences, a new problem is generated that the environmental load is increased.

It has been confirmed that the yellow pigment prepared in Example 1, which does not have a halogen element, is capable of a clear color display.

EXAMPLE 2

A yellow pigment having a molecular structure as shown in formula (6) below was prepared with a yield of 80% as in Example 1, except that 1 g of 1,5-dichloro anthraquinone was used in place of 2-chloro anthraquinone used in Example 1, and that the molar ratio of 1,5-dichloro anthraquinone to 1,3-dithiol was set at 1:2.

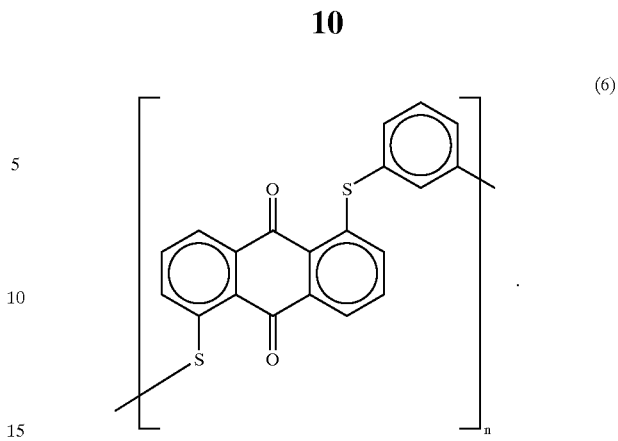

(6)

The pigment thus obtained was dispersed in an acrylic negative resist, followed by coating an array substrate with the resist and subsequently exposing the coating to light to form a pattern. As a result, a pseudo color filter of yellow alone was formed on the side of the array substrate. It has been visually confirmed that the pseudo color filter was capable of a good color display. Also, when observed 1000 hours later, defect in, for example, burning out was not recognized at all. The condition was the same as Example 1.

EXAMPLE 3

A cyan pigment was synthesized by the synthetic process (7) given below:

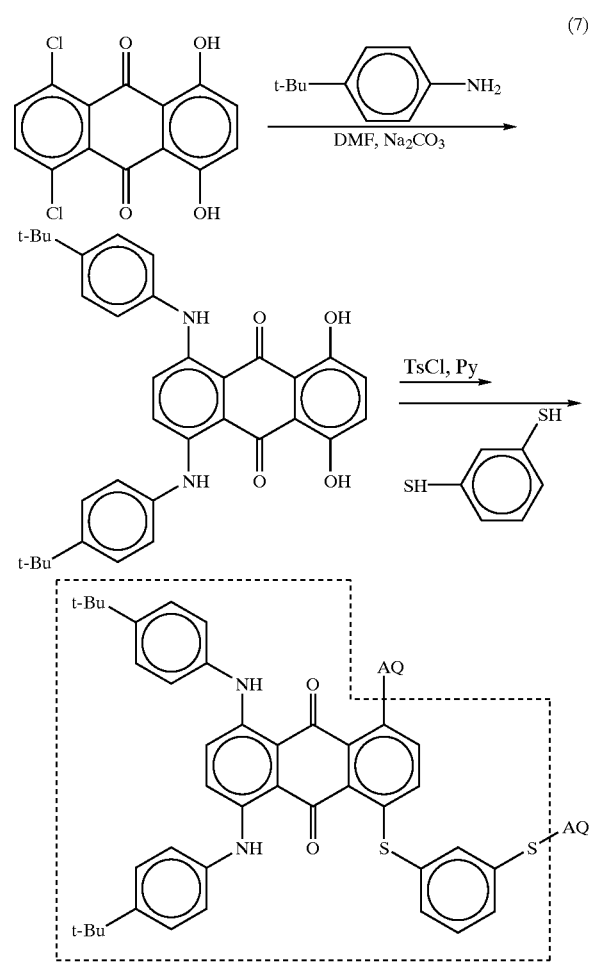

(7)

The reaction within DMF under a nitrogen gas stream was carried out in the presence of sodium carbonate at 80° C. for 24 hours under a molar ratio of 2:2. Also, the reaction in the presence of TsCl and Py was carried at 80° C. for 5 hours under a molar ratio of 2:2.

The pigment thus obtained was dispersed in an acrylic negative resist, followed by coating an array substrate with the resist and subsequently exposing the coating to light to form a pattern. As a result, a pseudo color filter of cyan alone was formed on the side of the array substrate. It has been visually confirmed that the pseudo color filter was capable of a good color display. Also, when observed 1000 hours later, defect in, for example, burning out was not recognized at all. The condition was the same as Example 1.

EXAMPLE 4

A magenta pigment was synthesized by the synthetic process (8) given below:

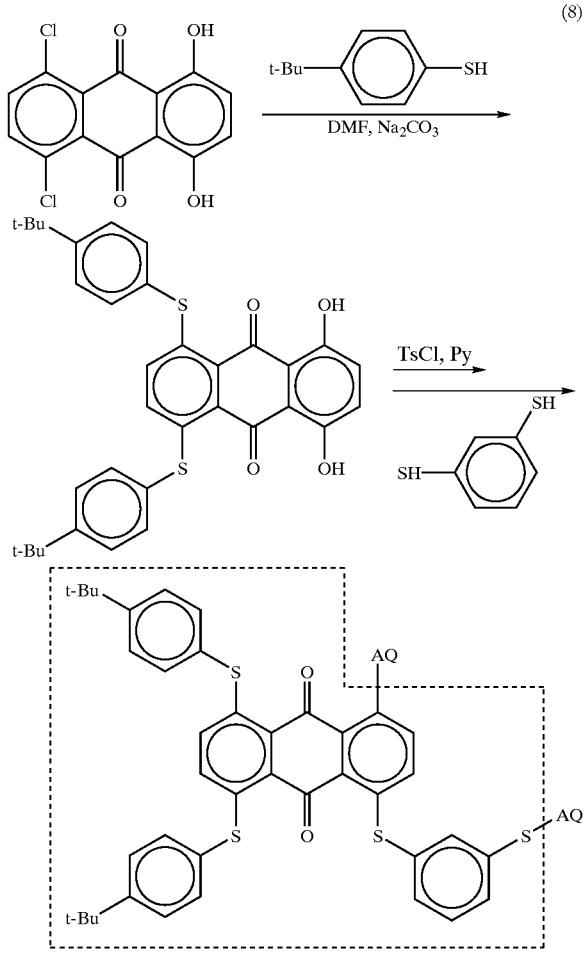

The reaction within DMF under a nitrogen gas stream was carried out in the presence of sodium carbonate at 80° C. for 5 hours under a molar ratio of 2:2. Also, the reaction in the presence of TsCl and Py was carried at 80° C. for 5 hours under a molar ratio of 2:2.

The pigment thus obtained was dispersed in an acrylic negative resist, followed by coating an array substrate with the resist and subsequently exposing the coating to light to form a pattern. As a result, a pseudo color filter of magenta alone was formed on the side of the array substrate. It has been visually confirmed that the pseudo color filter was capable of a good color display. Also, when observed 1000 hours later, defect in, for example, burning out was not recognized at all. The condition was the same as Example 1.

EXAMPLE 5

A coloring material of red for forming a color filter was prepared by mixing the yellow pigment obtained in Example 1 and the magenta pigment obtained in Example 4. Further, a coloring material of green for forming a color filter was prepared by mixing the yellow pigment obtained in Example 1 and the cyan pigment obtained in Example 3. Still further, a coloring material of blue for forming a color filter was prepared by mixing the cyan pigment obtained in Example 3 and the magenta pigment obtained in Example 4.

Each of the coloring materials for forming a color filter thus obtained was dispersed in an acrylic negative resist, followed by coating an array substrate with each of the resists and subsequently exposing the resist to light to form a pattern. As a result, prepared was a reflection type liquid crystal display device of an RGB plane arrangement system. It has been visually confirmed that it is possible to perform a good color display. Also, when observed 2000 hours later, defect in, for example, burning out was not recognized at all. The condition was the same as Example 1.

Figure 3:
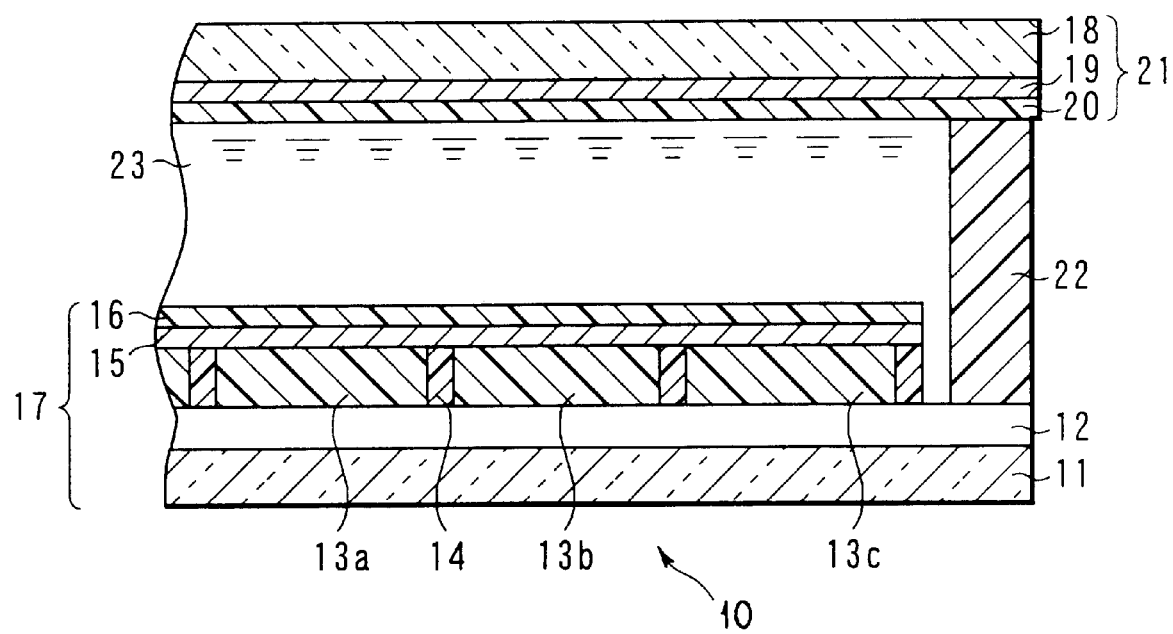
FIG. 3 is a cross sectional view exemplifying a liquid crystal display device constituting a display device of the present invention.

FIG. 3 is a cross sectional view exemplifying a liquid-crystal display device 10 of the present invention. As shown in the drawing, the liquid crystal display device 10 of the present invention comprises a CF on-array 17 and a counter substrate 21 arranged apart from each other with a spacer 22 interposed therebetween. A liquid crystal layer 23 is held in the space between the CF on-array 17 and the counter substrate 21.

The CF on-array 17 comprises a glass substrate 11, a TFT portion 12 formed on the glass substrate 11, and red, green and blue color filters 13a, 13b, 13c formed on the TFT portion 12. A black matrix 14 is arranged between adjacent color filters. Further, a patterned ITO film 15 and an orienting film 16 are formed successively on the color filters 13a, 13b, 13c.

On the other hand, the counter substrate 21 comprises a glass substrate 18, an ITO film 19 formed on the glass substrate 18, and an orienting film 20 formed on the ITO film 19.

The coloring material of the present invention is contained in each of the color filters 13a, 13b, 13c of the liquid crystal display device 10 shown in FIG. 3. As already described, the coloring material of the present invention is excellent in its durability and capable of performing a good color display. In addition, the substance formed by decomposition of the coloring material does not appreciably lower the resistance of the liquid crystal material. As a result, the resistance of the liquid crystal material is not appreciably lowered in the liquid crystal display device of the present invention. In addition, the liquid crystal display device performs a good color display.

Comparative Example 1

Phthalocyanine blue was dispersed in a resist similar to that used in Example 1 so as to prepare a liquid crystal display device similar to that prepared in Example 1.

When observed 600 hours later, a burning out was recognized. The condition was the same as Example 1.

Comparative Example 2

Phthalocyanine green (G7) was dispersed in a resist similar to that used in Example 1 so as to prepare a liquid crystal display device similar to that prepared in Example 1.

A burning out was observed in the initial stage after the preparation.

As described above, the present invention provides a coloring material excellent in durability and capable of a good color display. Also, the present invention provides a coloring material for a color filter excellent in durability, capable of a good color display, and, capable of preventing the decomposed substances thereof from lowering the resistance value of the liquid crystal material. Further, the present invention provides a display device capable of a good color display and a liquid crystal display device that does not bring about a marked reduction in the resistance value of the liquid crystal material and capable of a good color display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coloring material comprising:
   a plurality of organic basic skeletons each performing an acceptor function; and
   a donor substituent serving to connect two organic basic skeletons,
     wherein color is developed by the intramolecular electron migration between said substituent and said basic skeleton, wherein said coloring material has a chemical structure represented by general formula (1) given below:

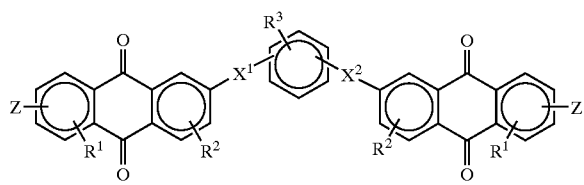

(1)

wherein each of $R^1$, $R^2$ and $R^3$, which may be the same or different, is at least one of hydrogen and an alkyl group, each of $X^1$ and $X^2$, which may be the same or different, is selected from the group consisting of S, O, NH and Se, and Z is at least one of hydrogen and an alkyl group.

2. A reflective type liquid crystal display device comprising the coloring material defined in claim 1.

3. A CF on-array type liquid crystal device comprising the coloring material defined in claim 1.

4. A coloring material for a color filter, comprising:
   a plurality of organic basic skeletons each performing an acceptor function; and
   a donor substituent serving to connect two organic basic skeletons, wherein said coloring material has a chemical structure represented by general formula (1) given below:

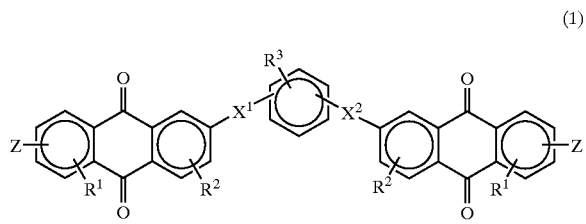

(1)

wherein each of $R^1$, $R^2$ and $R^3$, which may be the same or different, is at least one of hydrogen and an alkyl group, each of $X^1$ and $X^2$, which may be the same or different, is selected from the group consisting of S, O, NH and Se, and Z is at least one of hydrogen and an alkyl group.

5. The coloring material for the color filter according to claim 4, wherein each of $R^1$, $R^2$ and $R^3$ is hydrogen, each of $X^1$ and $X^2$ is S, and Z is hydrogen.

6. A reflective type liquid crystal display device comprising the coloring material defined in claim 5.

7. A CF on-array type liquid crystal device comprising the coloring material defined in claim 5.

8. A reflective type liquid crystal display device comprising the coloring material defined in claim 4.

9. A CF on-array type liquid crystal device comprising the coloring material defined in claim 4.

10. A coloring material for a color filter which has a chemical structure represented by general formula (9) given below:

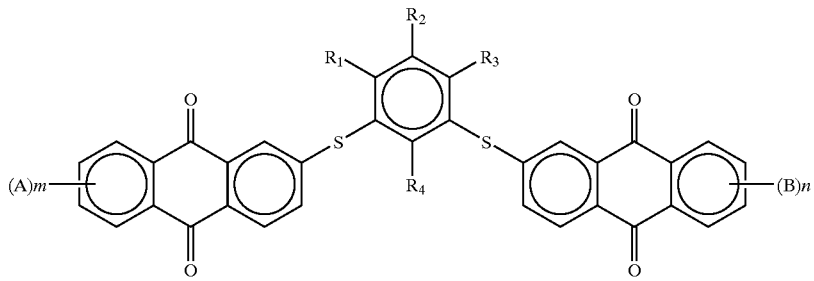

(9)

where $R_1$, $R_2$, $R_3$, $R_4$, A and B is selected from the group consisting of hydrogen atom, an alkyl group, a halogen atom, a nitro group, an amino group, a monoalkyl amino group, a dialkyl amino group, an alkoxy group, and a thioalkoxy group, and each of m and n is an integer of 1 to 4, wherein $R_1$, $R_2$, $R_3$, $R_4$ may be the same or different, and A and B may be the same or different.

11. The coloring material for a color filter according to claim 10, wherein said coloring material has a chemical structure represented by formula (2) given below:

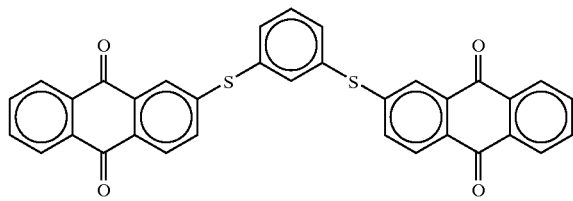

12. A reflective type liquid crystal display device comprising the coloring material defined in claim 11.

13. A CF on-array type liquid crystal device comprising the coloring material defined in claim 11.

14. A reflective type liquid crystal display device comprising the coloring material defined in claim 10.

15. A CF on-array type liquid crystal device comprising the coloring material defined in claim 10.

* * * * *